United States Patent

[11] 3,608,937

| [72] | Inventor | William E. Nave<br>South Bend, Ind. |
|---|---|---|
| [21] | Appl. No. | 34,283 |
| [22] | Filed | May 4, 1970 |
| [45] | Patented | Sept. 28, 1971 |
| [73] | Assignee | The Bendix Corporation |

[54] COUPLING DEVICE
9 Claims, 3 Drawing Figs.

| [52] | U.S. Cl. | 287/119, 287/91 |
|---|---|---|
| [51] | Int. Cl. | F16b 7/00 |
| [50] | Field of Search | 85/5 B; 287/DIG. 5, 119 R, 91; 24/211 N; 64/7 US |

[56] References Cited
UNITED STATES PATENTS

| 2,162,359 | 6/1939 | Rhinevault | 287/119 R |
| 2,399,581 | 4/1946 | Spooner | 85/5 B UX |

FOREIGN PATENTS

| 663,801 | 8/1938 | Germany | 85/5 B |
| 575,355 | 2/1946 | Great Britain | 24/211 N |

*Primary Examiner*—David J. Williamowsky
*Assistant Examiner*—Andrew V. Kundrat
*Attorneys*—Gordon H. Chenez and Plante, Hartz, Smith & Thompson ABSTRACT: A coupling device for connecting rotatable and pivotable relatively movable first and second members wherein an annular member fixedly secured to one of the relatively movable members is provided with an annular recess or bearing race in the inner wall thereof. A shaft portion of the other MEMBER extends into the cup-shaped portion and is provided with a diametrical bore having oppositely disposed spherical bearing elements which are urged outwardly from the diametrical bore into seating engagement with the annular recess or race by an intermediate spherical bearing element urged between and into alignment with the oppositely disposed bearing elements to secure the first and second members together. The intermediate spherical bearing element is engaged by and held in position by a spring-loaded spherical bearing element disposed in an axial bore which intersects the diametrical bore. The first and second members are prevented from pulling apart by the aligned spherical bearing elements in the diametrical bore which permit relative rotation of the first and second members and/or relative pivotal movement thereof on an axis passing through the aligned spherical bearing elements.

PATENTED SEP 28 1971

3,608,937

INVENTOR.
WILLIAM E. NAVE
BY
Gordon H. Chevey
AGENT

COUPLING DEVICE

BACKGROUND OF THE INVENTION

The present invention relates to a coupling device for coupling two relatively movable members together so as to prevent disengagement thereof and permit relative rotational and pivotal motion therebetween.

It is often desirable to couple a rotatable member such as a shaft with a nonrotatable member such as a housing or the like in such a manner that the rotatable and nonrotatable members are positively secured against separation thereof with minimum end play therebetween. Accordingly, it may be desirable to permit relative rotation or pivotal movement between the shaft and housing under the influence of force loads tending to separate the same wherein the friction effect between the relatively movable members is reduced to a minimum.

Various prior art devices of which I am aware for accomplishing the above desired result are not entirely satisfactory by virtue of difficulty encountered in assembly or disassembly thereof, undesirable friction generated causing binding when relative movement of the members occurs under relatively high force loads tending to separate the same, high cost of manufacture and, in many cases, relatively bulky elements which render the use of the same impractical in a confined location.

It is, therefore, an object of the present invention to provide a coupling device for two relatively movable members which is simple, easily assembled and disassembled and economical to manufacture.

It is another object of the present invention to provide a coupling device for two relatively movable members which positively secures the relatively movable members against separation and yet permits relative rotational and/or pivotal movement thereof with minimum friction under the influence of relatively high force loading tending to separate the relatively movable members.

It is an important object of the present invention to provide a coupling device for two relatively movable members which is compact and easily manufactured in a wide range of sizes.

Other objects and advantages will be apparent from the following description taken with the accompanying drawings.

DESCRIPTION OF THE PREFERRED EMBODIMENT

Figure 1:
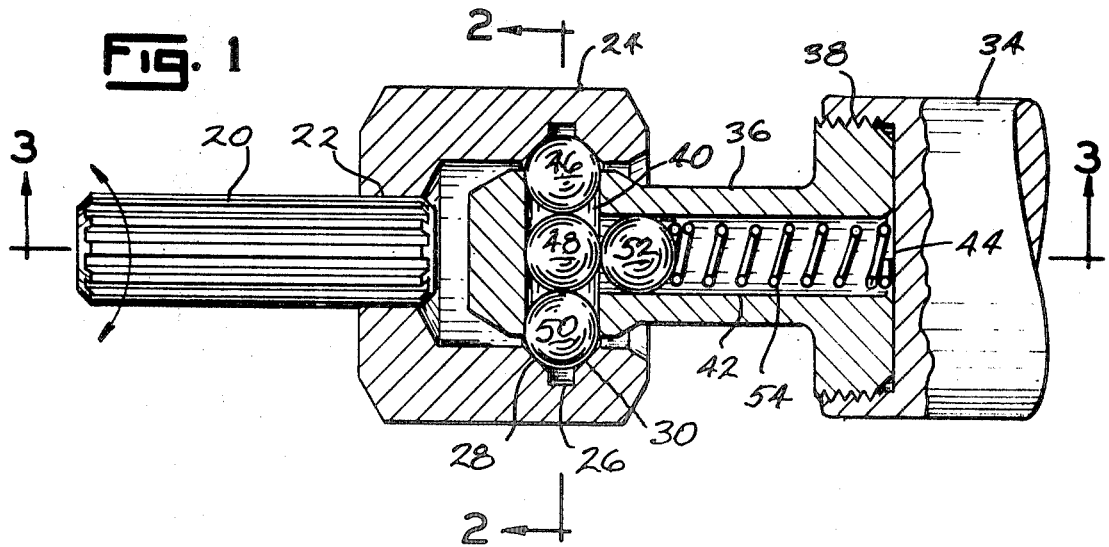
FIG. 1 is a schematic representation in section of two relative movable members and a coupling device therefor embodying the present invention.

Referring to the drawings, numeral 20 designates a rotatable shaft suitably splined, threaded or otherwise adapted to unite with a corresponding splined or mating opening 22 in the base of a generally cup-shaped housing member 24 thereby fixedly securing shaft 20 and member 24 together. An annular groove or bearing raceway 26 having beveled sidewalls 28 and 30 is formed in the interior wall portion of a circular cavity 32 defined by housing member 24.

A nonrotatable shaft 34 is provided with a circular stub end portion 36 suitably secured thereto by fastening means such as screw threads 38. The stub end portion 36 is provided with a diametrical circular channel 40 and an axial channel 42 which axial channel extends from diametrical channel 40 to one end of stub end portion 36 where it is blocked by a transverse wall 44 of shaft 34. The diametrical and axial channels 40 and 42, respectively, are arranged with intersecting axes. The diametrical channel 40 is adapted to receive a plurality of balls or spherical bearing members which in the preferred form number three designated by 46, 48 and 50. The diametrically opposite balls 46 and 50 are urged apart by ball 48 into engagement with the beveled sidewalls 28 and 30 to thereby lock stub end portion 36 and housing member 24 together to prevent relative axial displacement thereof under the influence of axial loads imposed on shaft 20 and/or shaft 34. The intermediate ball 48 is held in position between balls 46 and 50 by a ball or spherical bearing member 52 freely contained by axial channel 42 and loaded by a compression spring 54 interposed between ball 52 and the wall 44.

The stub end portion 42 is quickly and easily assembled or disassembled relative to member 24. Assuming the stub end portion 42 to be detached from shaft 34 and spring 54 as well as balls 48 and 52 removed from channel 42, the balls 46 and 50 are free to move inwardly in channel 40 into engagement thereby clearing the outermost ends of channel 40. The stub end portion 36 is inserted into the cup-shaped member 24 with channel 40 approximately in line with annular groove 26 whereupon balls 48 and 52 are inserted into channel 42. Spring 54 is seated against ball 52 which, in turn, urges ball 48 between balls 46 and 50 causing the latter to seat against walls 28 and 30. The shaft 34 and stub end portion 36 may then be threaded together causing wall 44 to bear against spring 54 compressing the same to maintain force loading on the ball 52 and thus ball 48.

The above sequence is reversed to disassemble the stub end portion 36 from member 24.

In operation, the shaft 20 may be connected to suitable control apparatus, not shown, adapted to rotatably and/or axially actuate the shaft 20 in response to selected parameters of operation. Rotational movement of shaft 20 results in balls 46 and 50 rotating in the same direction along walls 28 and 30. It will be noted that ball 48 tends to assist the rotation of either ball 46 or 50 in response to rotation of the other. The shaft 20 may be actuated axially simultaneously with rotation thereof in which case the balls 46 and 50 which are trapped between beveled wall portions 28 and 30 urge stub end portion 36 and thus shaft 34 in a corresponding axial direction. The lateral play between balls 46 and 50 and wall portions 28 and 30 can be made insignificant by proper dimensioning of the diameter of the annular groove 26 including wall portions 28 and 30 relative to the combined diameters of the three balls 46, 48 and 30 as will be recognized by those persons skilled in the art.

Friction can be reduced to a minimum by suitable lubrication of balls 46, 48 and 50; for example, packing the annular groove between wall 28 and 30 with grease.

It will be noted that the balls 48 and 52 have point contact through which the force load of spring 54 is applied against ball 48 thereby minimizing friction effects tending to restrict rotation of ball 48.

Figure 3:
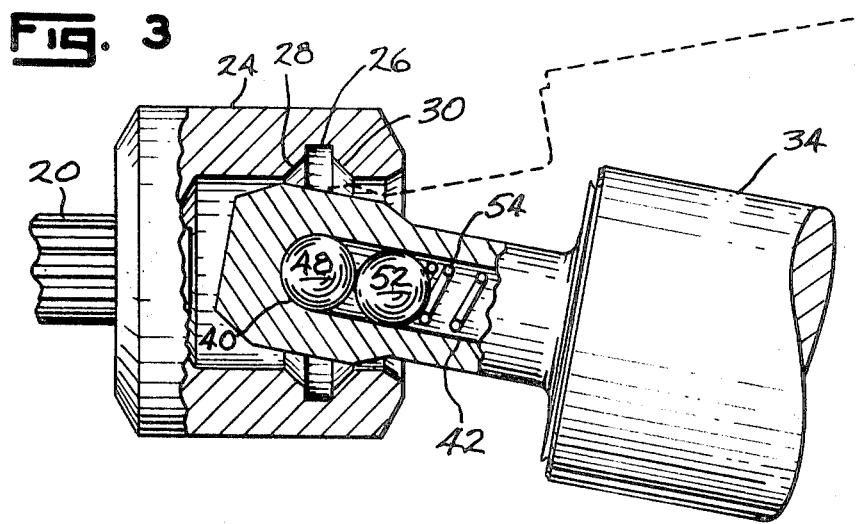
FIG. 3 is a section view taken on line 3—3 of FIG. 1.
Figure 2:
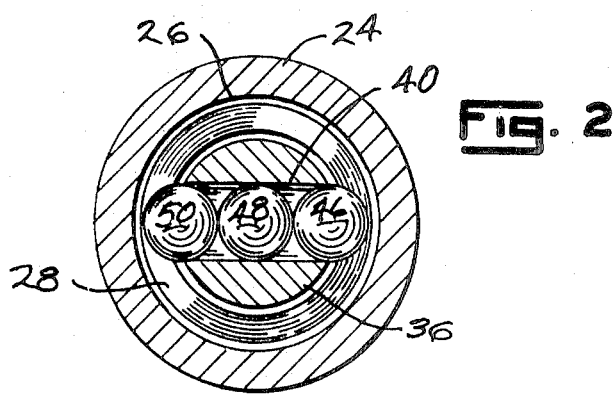
FIG. 2 is a section view taken on line 2—2 of FIG. 1.

The stub end portion 42 may be rotated and pivoted relative to member 24. Pivotal movement of stub end portion 42 occurs about an axis joining the centers of the balls 46, 48 and 50 as indicated in FIG. 3. The degree of pivotal movement depends upon the relative diameters of sub portion 42 and adjacent interior wall of member 24 as well as the extent of overlap of the stub end portion 42 and the member 24 which relationships maybe varied as desired.

It will be understood that applicant's coupling device heretofore described is capable of providing a flexible joint between two relatively movable members such as rotatable and nonrotatable shafts wherein one shaft is to be translated in response to axial movement in either direction of the other shaft accurately and efficiently with a minimum force loading.

I claim:

1. A coupling device for two movable members at least one of which is movable relative to the other, said coupling device comprising:

a housing member fixedly secured to one of said movable members;

a circular cavity in said housing;

an annular groove in the wall of said circular cavity;

a generally circular end portion of the other movable member adapted to be received by said circular cavity;

an axially extending channel in said end portion;

a diametrically extending channel in said end portion and intersecting said axially extending channel;

first and second spherical bearing members rotatably carried by said diametrically extending channel;

at least one-third spherical bearing member interposed between said first and second spherical bearing members for urging the same radially outwardly into seating engagement with said annular groove;

means slidably carried in said axially extending channel and bearing against said third spherical bearing member to establish point contact therewith; and resilient means in said axially extending channel for imposing a force load against said last named means to maintain said third spherical bearing in position intermediate said first and second spherical bearing members said one movable member and housing is rotatable about said circular end portion; and said other movable member and circular end portion is rotatably fixed and pivotally actuatable about an axis defined by a straight line extending through the centers of said first and second spherical bearing members.

2. A coupling device as claimed in claim 1 wherein:

said one movable member is rotatably actuated; and said other movable member is rotatably fixed.

3. A coupling device as claimed in claim 1 wherein:

said one movable member is rotatably and axially actuatable in response to axial movement of said one movable member.

4. A coupling device as claimed in claim 1 wherein:

said annular groove includes spaced-apart first and second beveled wall portions separated by an annular recess extending radially outwardly therefrom;

said first and second spherical bearing means bearing against said spaced-apart first and second beveled wall portions and adapted to prevent relative axial movement between said housing member and said circular end portion.

5. A coupling device as claimed in claim 1 wherein:

said means slidably carried in said axially extending channel is a fourth spherical bearing member interposed between said third spherical bearing member and said resilient means.

6. A coupling device as claimed in claim 1 wherein:

said generally circular end portion is removably secured to said movable member to permit access to said axially extending channel;

said resilient means together with said means slidably carried in said axially extending channel and said third spherical bearing members being removable from said axially extending channel to permit said first and second spherical bearing members to move radially inwardly relative to said annular groove thereby disengaging said end portion from said housing member.

7. A coupling device as claimed in claim 6 wherein said resilient means is a compression spring.

8. A coupling device as claimed in claim 1 wherein:

said circular end portion of said other movable member is relatively smaller in diameter than said circular cavity to provide the desired degree of pivotal movement of said other movable member.

9. A coupling device as claimed in claim 1 wherein:

said axially and diametrically extending channels are arranged with intersecting longitudinal axes.